Figure 1:
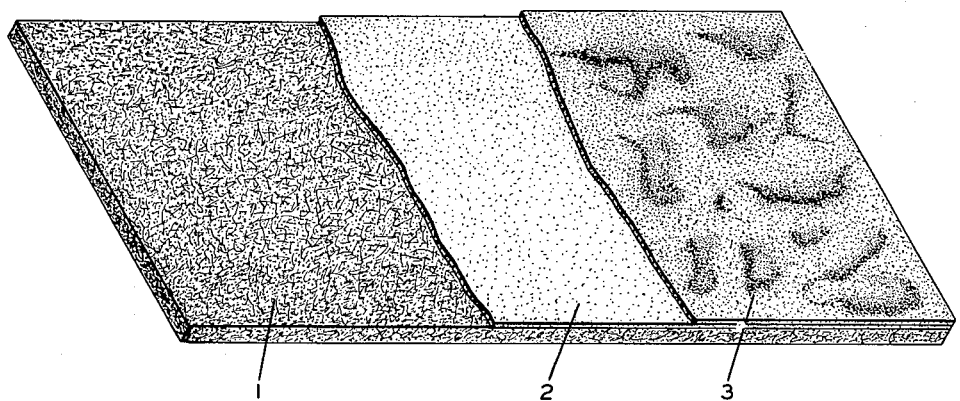

March 20, 1956

I. I. BEZMAN ET AL 2,739,082

FELT BASE FLOOR COVERING

Filed March 20, 1952

INVENTOR
IRVING I. BEZMAN
DANIEL D. BROWNING

ATTORNEY

United States Patent Office 2,739,082
Patented Mar. 20, 1956

2,739,082

FELT BASE FLOOR COVERING

Irving I. Bezman, Pittsburgh, and Daniel D. Browning, Lancaster, Pa., assignors to Armstrong Cork Company, Lancaster, Pa., a corporation of Pennsylvania Application March 20, 1952, Serial No. 277,584

7 Claims. (Cl. 117—76)

This application is a continuation-in-part of our co-pending application Serial No. 207,587, filed January 24, 1951, now abandoned.

This invention relates to felt base floor coverings. More particularly, the invention relates to an improvement in felt base floor coverings having a saturated felt backing; a coating paint containing an inherently tacky compound which serves to enhance the adhesion between the coating paint and the felt and a reinforcing agent, which is a resinous vinyl type polymer and which serves to build up the internal strength of the coating paint and also, because of chemical similarities to the wearing surface, to enhance adhesion between the laminating film and the wearing surface, and an excess of a filler material to enhance laminate strength by affording a microscopically roughened surface; and a decorative or wearing surface containing a vinyl resin.

Felt base floor coverings are well known to the art and are comprised of a saturated felt backing, a seal coat or intermediate coat, and a paint film which serves as both a decorative and wearing surface. These floor coverings are to be distinguished from linoleum inasmuch as in the manufacture of linoleum the mix, which is comprised of oxidized and polymerized siccative oil-resin gel, pigments, and fillers, is deposited upon a backing which may be of burlap or saturated felt. The linoleum type floor coverings are, generally speaking, more expensive and much longer wearing because the comparatively thick coating of cured linoleum mix constitutes the wearing and decorative surface in contrast to the relatively thin paint film which constitutes the wearing and decorative surface of felt base goods. However, felt base floor coverings are widely used as resilient hard surface flooring material.

Considerable research has been spent upon the development of improved surface coatings for use in the manufacture of felt base floor coverings. Recently, various types of resin formulations have been proposed for use as the wearing and decorative surface of such hard surface floor coverings. Such materials are, generally speaking, more suitable than the older paint films because they are characterized by better color and increased resistance to alkalies such as are normally encountered in soaps and cleaning preparations. One class of materials which has been suggested as a decorative coating for felt base goods is the class of vinyl resins. There are numerous well-known examples of vinyl resins. Probably the most widely known are copolymers of vinyl chloride and vinyl acetate. Generally speaking, the commercially available copolymers contain from about 5% to 15% by weight of polymerized vinyl acetate. Other vinyl resins include polyvinyl chloride, copolymers of vinyl chloride and vinylidene chloride, maleic anhydride, modified polyvinyl chloride, and the like. Although these vinyl resins do exhibit excellent properties as far as resistance to alkali and improved color characteristics are concerned, it has been exceedingly difficult to obtain a felt base floor covering in which the vinyl resin decorative coat "keys" strongly to the impregnated felt base. The various paint coats which are normally employed on saturated felt do not possess sufficient adhesion to the vinyl resin decorative coatings to retain them in place on the surface of the floor coverings. For instance, it is possible with the normal coating paint, which is comprised of the product resulting from the oxidation and polymerization of a drying oil, such as linseed oil, soya bean oil, dehydrated castor oil, tung oil, and the like, in the presence of a resin, such as rosin, copal resin, ester gum, and the like, to strip completely a vinyl resin decorative coating from the finished product with little effort.

With the above in mind, we have endeavored to provide a felt base floor covering comprised of a saturated felt backing carrying a coating paint containing three essential ingredients. Over the coated felt is provided a vinyl resin decorative coating. The resulting floor covering is characterized by excellent resistance to alkali, and the coating paint is capable of securely holding the decorative vinyl resin coating in place due to the excellent adhesive properties of the coating paint. In one embodiment of our invention which is illustrated in Figure 1, we provide a saturated felt backing 1 to which is applied an intermediate coating 2 containing a rubberlike component as a tackifier, a resinous component as a reinforcer, and an excess of filler. Generally speaking, advantageous results are obtained when the adhesive coating paint contains about 20% to about 50% rubberlike polymer-resin mixture and about 80% to about 50% inert filler; the binder mixture advantageously contains about 25% to 80% rubberlike polymer and about 75% to 20% reinforcing resin. If less than about 25% rubberlike polymer is employed, the coating paint odes not key well to the saturated felt base. If less than about 20% reinforcing resin is contained in the coating paint, a good key between the paint and the vinyl resin decorative coat is not obtained. Particularly advantageous results have been obtained with compositions containing 40% to 65% rubberlike polymer and 60% to 35% reinforcing resin. As to the quantity of inert filler, we have found that with less than about 50% filler we do not obtain the desired "tooth" or mechanical bond between the coating paint and adjacent surfaces. However, when more than about 80% filler is used, the coating paint possesses very little internal strength. Typical examples of tackifiers and reinforcing agents which may be used in the practice of our invention are the following:

A. TACKIFIERS

1. A styrene-butadiene copolymer containing 30–60 parts of styrene and 70–40 parts of butadiene.
2. An acrylonitrile-butadiene copolymer containing 55–80 parts of butadiene and 45–20 parts of acrylonitrile.
3. An isobutylene-isoprene copolymer containing 97–99 parts of isobutylene with 3–1 parts of isoprene.
4. A polychloroprene.

B. REINFORCING AGENTS

1. Polyvinyl chloride.
2. A copolymer of polyvinyl chloride and polyvinyl acetate containing 95–80 parts of polyvinyl chloride with 5–20 parts of polyvinyl acetate.
3. A polyvinyl chloride-polyvinylidene chloride copolymer containing a majority of polyvinylidene chloride.
4. A styrene-butadiene copolymer containing 98–80 parts of styrene with 2–20 parts of butadiene.
5. Polystyrene.

Various combinations of tackifier with reinforcing agent have been used and found to be successful for the purpose. The preferred binder formulations contain 35–60 parts of polyvinyl chloride with 65–40 parts of a butadiene-acrylonitrile copolymer containing 65 parts of butadiene and 35 parts of acrylonitrile. Best results were obtained with a ratio of 55 parts of polyvinyl chloride together with 45 parts of the butadiene-acrylonitrile copolymer. A second preferred composition cotnains 50–80 parts of a butadiene-acrylonitrile copolymer (65 parts of butadiene–35 parts of acrylonitrile) with 50–20 parts of a resinous copolymer of vinyl chloride and vinylidene chloride. Best results were obtained with a ratio of 70 parts of the butadiene-acrylonitrile copolymer together with 30 parts of resinous copolymer.

In each instance about 1 to 4 parts of an inert filler, such as wood flour, micronized slate, whiting, clay, and the like, are employed for 1 part of the binder or resin-rubberlike polymer mixture.

In accordance with our invention, the backing may be felt saturated with any of the usual saturants, such as asphalt, rubber, synthetic rubbers, blends of asphalt and rubber, and the like. If desired, the saturation may be carried out by passing a web of felt obtained from a paper-making machine through a bath containing the desired saturant. On the other hand, we may utilize a saturated felt prepared by a beater saturation process. For example, the papermaking fibers may be suspended in a beater containing the desired saturants, such a butadiene-styrene copolymer, butadiene-acrylonitrile copolymer, polymer of chloroprene, natural rubber, and the like; and the rubberlike solids may then be deposited upon the fibers by coagulation using known coagulants such as papermakers' alum. The resulting coated fibers are then formed on a wire to obtain the sheet having the saturant therein. To this backing of saturated felt is applied the adhesive coating paint described above. Generally speaking, the application is by means of a doctor blade inasmuch as the ingredients are all in aqueous dispersion. In fact, in compounding the coating paint an aqueous dispersion of each of the components is used. If desired, roll coating may be used to obtain the coating. After the saturated felt is coated with the composition as described hereinabove, the water is driven off by heating at slightly elevated temperatures such as about 70° C. to 90° C. Generally speaking, a period of about five minutes to two hours is required to remove the desired amount of water.

Following the application of the coating paint to the impregnated felt backing as indicated above, the resulting material can be coated with a decorative wearing surface 3 and heated at elevated temperatures such as about 165° C. to flux the vinyl coating. The heating step also serves to improve the bond between the saturated felt base and the coating paint and the wearing surface coating.

Figure 2:
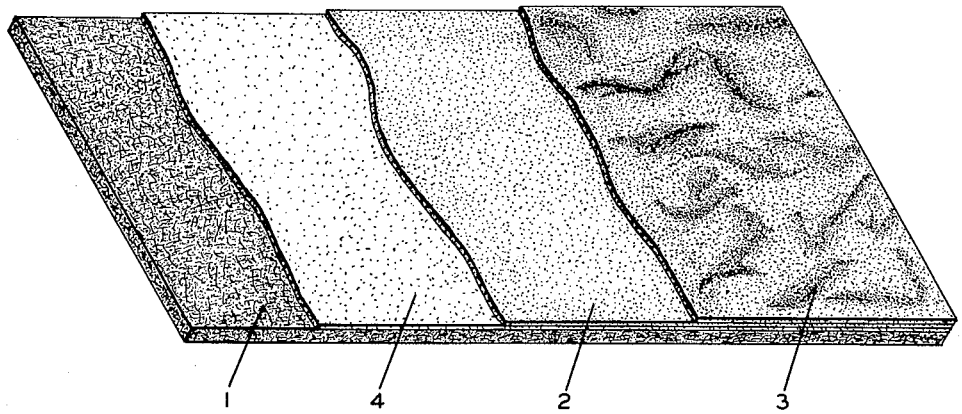

In another embodiment of our invention illustrated in Figure 2, the saturated felt is first coated with a conventional drying oil-resin gel coat. Over this coat is applied the adhesive coating paint described above. Following application of the coating paint the vinyl resin decorative film is then applied. In Figure 2, 1 designates saturated felt backing, 2 the coating paint, 3 the decorative vinyl resin coat, and 4 a conventional drying oil-resin gel coating.

The following specific examples are typical of the preparation of the adhesive coating paint employed in the practice of our invention.

*Example I*

2 parts by weight of Darvan #1 (sodium salt of polymerized alkyl aryl sulfonic acid) and 2 parts by weight of tetrasodium pyrophosphate are dissolved in 86 parts by weight of water. 200 parts by weight of clay are then added and the mixture is ball milled for a period of at least five hours. After the clay slurry is removed from the ball mill, its pH is adjusted to 7–10 by means of small additions of ammonium hydroxide (10% solution). The clay slurry is then mixed with 70 parts by weight of polyvinyl chloride resin latex (50% solids) and 130 parts by weight of butadiene-acrylonitrile rubber latex (50% solids) and a small amount (approximately 1 cc. per pound of formulation) of octyl alcohol is added as an antifoam agent.

*Example II*

60 parts by weight of a polystyrene resin latex (50% solids) and 140 parts by weight of a styrene-butadiene copolymer resin latex (50% solids) are blended. Thereafter, 3 parts by weight of Darvan #1 (sodium salt of polymerized alkyl aryl sulfonic acid) and 3 parts by weight of tetrasodium pyrophospate are added, together with sufficient ammonium hydroxide (10% solution) to maintain the pH of the mixture at 7–10. 300 parts by weight of slate flour are added to the resulting mixture, and the material is stirred slightly in order to wet down the dry mix. The mixture is then placed in a ball mill and ground for a period of about five hours. If the formulation is foamed upon removal from the ball mill, this condition can be almost completely eliminated by overnight standing. Any residual foam can be dissipated by the addition of a small amount (about 1 cc. per pound of formulation) of octyl alcohol.

*Example III*

2 parts by weight of Darvan #1 (sodium salt of polymerized alkyl aryl sulfonic acid) and 2 parts by weight of tetrasodium pyrophosphate are dissolved in 86 parts by weight of water. 200 parts by weight of whiting are then added and the mixture is ball milled for a period of at least five hours. After the slurry is removed from the ball mill, its pH is adjusted to 7–10 by means of small additions of ammonium hydroxide (10% solution). The slurry is then mixed with 110 parts by weight of polyvinyl chloride resin latex (50% solids) and 90 parts by weight of butadiene-acrylonitrile rubber latex (50% solids) and a small amount (approximately 1 cc. per pound of formulation) of octyl alcohol is added as an antifoam agent.

Products resulting from the practice of our invention are characterized by excellent color of the decorative surface as well as a bond between the various coatings and between the coating paint and the saturated felt backing. The products can be readily prepared inasmuch as aqueous dispersions of materials may be used; and it is unnecessary to employ volatile solvents, the use of which may be hazardous.

We claim:

1. A felt base floor covering comprising a saturated felt backing; an adhesive coating paint containing about 50% to about 80% by weight of an inert filler and about 50% to about 20% by weight of a composition containing about 25% to about 80% by weight of a rubberlike material of the group consisting of butadiene-styrene copolymers, butadiene-acrylonitrile copolymers, isobutylene-isoprene copolymers, and polychloroprene, and about 75% to about 20% by weight of a reinforcing agent of the group consisting of polyvinyl chloride, copolymers of vinyl chloride and vinyl acetate, copolymers of vinyl chloride and vinylidene chloride, resinous copolymers of styrene and butadiene, and polystyrene; and a decorative surface coating containing vinyl resin.

2. A felt base floor covering comprising a saturated felt backing; an adhesive coating paint containing about 50% to about 80% by weight of an inert filler and about 50% to about 20% by weight of a composition containing about 40% to about 65% by weight of a rubberlike material of the group consisting of butadiene-styrene copolymers, butadiene-acrylonitrile copolymers, isobutylene-isoprene copolymers, and polychloroprene, and about 60% to 35% by weight of a reinforcing agent of the group consisting of polyvinyl chloride, copolymers of vinyl chloride and vinyl acetate, copolymers of vinyl chloride and vinylidene chloride, resinous copolymers of styrene and butadiene, and polystyrene; and a decorative surface coating containing vinyl resin.

3. A felt base floor covering comprising a saturated felt backing; an adhesive coating paint containing about 50% to about 80% by weight of an inert filler and about 50% to about 20% by weight of a composition containing about 40% to about 65% by weight thereof of a butadiene-acrylonitrile rubber and about 60% to about 35% by weight thereof of polyvinyl chloride; and a decorative surface coating containing vinyl resin.

4. A felt base floor covering comprising a saturated felt backing; an adhesive coating paint containing about 50% to about 80% by weight of an inert filler and about 50% to about 20% by weight of a composition containing about 25% to about 80% by weight thereof of a butadiene-acrylonitrile rubber and about 75% to about 20% by weight thereof of polyvinyl chloride; and a decorative surface coating containing vinyl resin.

5. A felt base floor covering comprising a saturated felt backing; an adhesive coating paint containing about 50% to about 80% by weight of an inert filler and about 50% to about 20% by weight of a composition containing about 45 parts of butadiene-acrylonitrile rubber and about 55 parts of polyvinyl chloride; and a decorative surface coating containing vinyl chloride resin.

6. A floor covering comprising a saturated felt backing carrying a drying oil resin-gel coat, said coating having applied thereto an adhesive coating paint containing about 50% to about 80% by weight of an inert filler, about 50% to about 20% by weight of a composition containing about 25% to 80% by weight thereof of a rubberlike material of the group consisting of butadiene-styrene copolymers, butadiene-acrylonitrile copolymers, isobutylene-isoprene copolymers, and polychloroprene, and about 75% to about 20% by weight thereof of a reinforcing agent of the group consisting of polyvinyl chloride, copolymers of vinyl chloride and vinyl acetate, copolymers of vinyl chloride and vinylidene chloride, resinous copolymers of styrene and butadiene, and polystyrene; and a decorative surface coating containing vinyl resin.

7. A felt base floor covering comprising a saturated felt backing carrying a drying oil resin-gel coat, said coating having applied thereto an adhesive coating paint containing about 50% to about 80% by weight of an inert filler and about 50% to about 20% by weight of a composition containing about 40% to about 65% by weight thereof of a butadiene-acrylonitrile rubber and about 60% to about 35% by weight thereof of polyvinyl chloride; and a decorative surface coating containing vinyl chloride resin.

References Cited in the file of this patent

UNITED STATES PATENTS

| Number | Name | Date |
|---|---|---|
| 2,133,886 | Beegle | Oct. 18, 1938 |
| 2,330,353 | Henderson | Sept. 28, 1943 |
| 2,430,934 | Kemmler et al. | Nov. 18, 1947 |
| 2,556,885 | Ness | June 12, 1951 |
| 2,589,502 | Lurie | Mar. 18, 1952 |
| 2,624,682 | Hazeltine, Jr. | Jan. 6, 1953 |
| 2,624,683 | Bezman | Jan. 6, 1953 |